(12) United States Patent
Deluga et al.

(10) Patent No.: US 11,379,625 B2
(45) Date of Patent: Jul. 5, 2022

(54) MODULAR DEVICES WITH LATCHES

(71) Applicant: Hewlett-Packard Development Company, L.P., Houston, TX (US)

(72) Inventors: Ronald E Deluga, Houston, TX (US); Michael J Pescetto, Houston, TX (US); Michael Delpier, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 730 days.

(21) Appl. No.: 16/097,820

(22) PCT Filed: Jul. 13, 2016

(86) PCT No.: PCT/US2016/042058
§ 371 (c)(1),
(2) Date: Oct. 30, 2018

(87) PCT Pub. No.: WO2018/013106
PCT Pub. Date: Jan. 18, 2018

(65) Prior Publication Data
US 2019/0138757 A1    May 9, 2019

(51) Int. Cl.
*G06F 21/88* (2013.01)
*E05B 73/00* (2006.01)
*H05K 5/00* (2006.01)

(52) U.S. Cl.
CPC .......... *G06F 21/88* (2013.01); *E05B 73/0082* (2013.01); *H05K 5/0021* (2013.01)

(58) Field of Classification Search
CPC ... G06F 21/88; E05B 73/0082; H05K 5/0021; A44B 17/0011; A44B 11/263;
(Continued)

(56) References Cited

U.S. PATENT DOCUMENTS 5,995,366 A * 11/1999 Howell ............... G06F 1/1632
248/552
6,073,333 A    6/2000 Orr
(Continued)

FOREIGN PATENT DOCUMENTS

CN      1662990      8/2005
CN     104066289     9/2014
(Continued)

OTHER PUBLICATIONS

Brad Linder, Lenovo ThinkPad Stack Modular PC Accessories Hit the FCC, May 28, 2015, <https://liliputing.com/2015/05/lenovo-thinkpad-stack-modular-pc-accessories-hit-the-fcc.html> (Year: 2015).*

*Primary Examiner* — Hai Phan
*Assistant Examiner* — Anthony D Afrifa-Kyei
(74) *Attorney, Agent, or Firm* — HP Inc. Patent Department

(57) ABSTRACT

An example modular device includes a housing having an upper side, a lower side, and a sidewall having a first opening. The modular device also includes an attachment tab to attach the peripheral device to a second modular device at the upper side. The modular device further includes a latch disposed within the housing. The latch includes a main body having a second opening aligned with the first opening to receive an anti-theft device. The latch also includes a latch arm extending from the main body to control an engagement of the attachment tab with the second modular device. The latch further includes a latch unlocking tab exposed at the lower side to control a position of the latch.

14 Claims, 8 Drawing Sheets

(58) Field of Classification Search
CPC ......... A44C 5/14; A44C 5/2085; F16B 17/00;
F16B 2/005; F16B 2/04; F16B 2/06;
F16B 2/12; F16B 2/14; G04B 37/1486;
G04B 37/00; G04B 37/14; G04B 37/1493
See application file for complete search history.

(56) References Cited

U.S. PATENT DOCUMENTS

| | | | |
|---|---|---|---|
| 6,698,851 B1 * | 3/2004 | Ludl | H05K 5/0021 |
| | | | 312/108 |
| 9,285,846 B2 | 3/2016 | Degner et al. | |
| 9,877,549 B2 * | 1/2018 | Perkins | F16B 2/04 |
| 2007/0079042 A1 | 4/2007 | Crosswy et al. | |
| 2012/0260698 A1 | 10/2012 | Allen et al. | |
| 2013/0279121 A1 | 10/2013 | Lin et al. | |
| 2014/0285954 A1 | 9/2014 | Liang et al. | |
| 2014/0321046 A1 | 10/2014 | Sinha et al. | |

FOREIGN PATENT DOCUMENTS

| | | |
|---|---|---|
| CN | 204098644 | 1/2015 |
| EP | 0308810 A2 | 9/1988 |
| EP | 2759663 A2 | 7/2014 |
| EP | 2759663 A2 | 7/2014 |
| TW | M261961 | 4/2005 |
| TW | I464563 | 12/2014 |
| WO | WO-2012137007 A1 | 10/2012 |

\* cited by examiner

MODULAR DEVICES WITH LATCHES

BACKGROUND

Increasingly, desktop computers come in smaller and smaller form factors to reduce footprint. In some examples, a computing system takes a modular approach to reduce the overall system footprint.

BRIEF DESCRIPTION OF THE DRAWINGS

Some examples of the present application are described with respect to the following figures.

DETAILED DESCRIPTION

A modular computing system may include a computing device and a plurality of peripheral devices coupled in a stacked configuration. The computing device and the peripheral devices may have the same width. Thus, the overall footprint of the modular computing system may remain the same even as additional modules are added to the modular computing system. However, modules of a modular computing system may be vulnerable to theft due to the small form factor.

Examples described herein provide a modular device to enable a modular computing system to be secured via a single anti-theft device. For example, a modular device may include a housing having an upper side, a lower side, and a sidewall having a first opening. The modular device may also include an attachment tab to attach the peripheral device to a second modular device at the upper side. The modular device may further include a latch disposed within the housing. The latch may include a main body having a second opening aligned with the first opening to receive an anti-theft device. The latch may also include a latch arm extending from the main body to control an engagement of the attachment tab with the second modular device. The latch may further include a latch unlocking tab exposed at the lower side to control a position of the latch.

In another example, a modular device may include a housing having an upper side and a sidewall. The sidewall may include a first opening and a second opening. The sidewall may be perpendicular to the upper side. The modular device may further include an attachment tab to attach the modular device to a second modular device at the upper side. The modular device may further include a latch disposed within the housing. The latch may include a main body, a latch arm extending from the main body to control an engagement of the attachment tab with the computing device, and a latch unlocking member engaged with the main body to control a position of the latch. The latch unlocking member may include a latch unlocking tab exposed at the first opening. The latch may also include a latching securing member engaged with the latch unlocking member. The latching securing member may include a third opening that is aligned with the second opening to receive an anti-theft device. In this manner, examples described herein may reduce a likelihood of theft of a modular computing system.

Figure 1B:
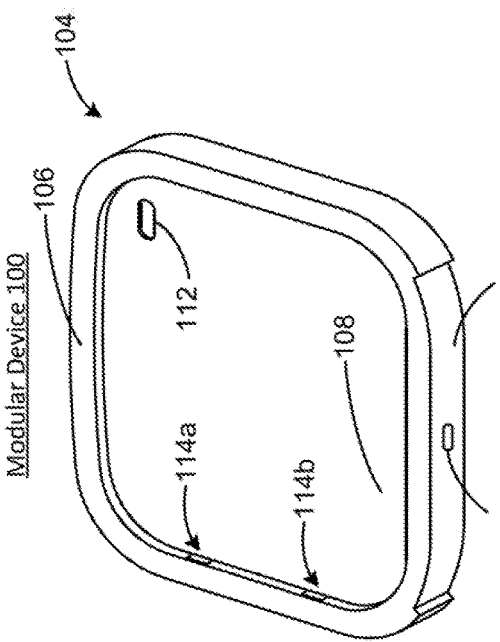
FIG. 1B illustrates a perspective view of the modular device of FIG. 1A, according to an example.
Figure 1C:
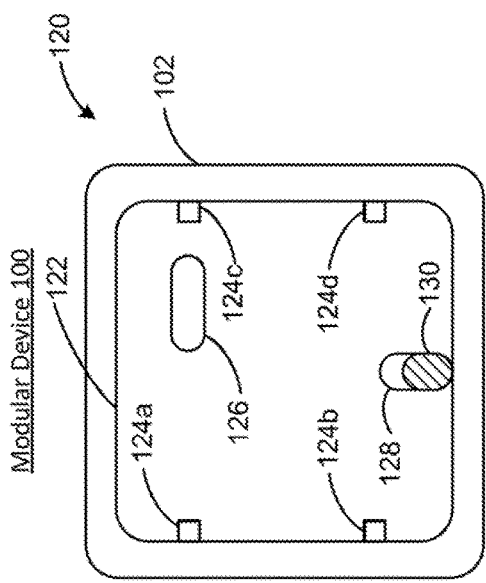
FIG. 1C illustrates a bottom view of the modular device of FIG. 1A, according to an example.
Figure 1A:
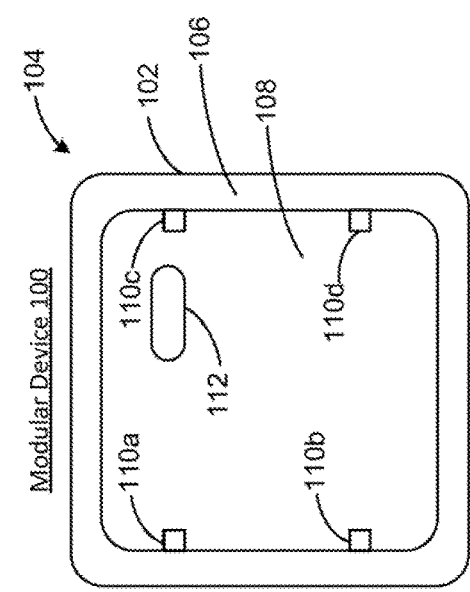
FIG. 1A illustrates a top view of a modular device with a set of attachment tabs controlled by a latch, according to an example.

FIG. 1A illustrates a top view of a modular device 100 with a set of attachment tabs controlled by a latch, according to an example. Modular device 100 may be any electronic device or mechanical device that provides a function to a modular computing system. For example, modular device 100 may be implemented as a computing device that controls the operations of a modular computing system. As another example, modular device 100 may be implemented as a peripheral device, such as a speaker, a storage device, an optical disk reader, etc. As another example, modular device 100 may be implemented as a mechanical mounting device.

Modular device 100 may include a housing 102 that houses components of modular device 100. Housing 102 may include an upper side 104. Upper side 104 may include a raised region 106 and a recessed region 108 that is defined by raised region 106. Modular device 100 may also include a set of attachment tabs 110a-110d to attach modular device 100 to another modular device at upper side 104. The set of attachment tabs 110a-110d may be retractable into raised region 106 when modular device 100 is to be removed from an attached modular device. An engagement of the set of attachment tabs 110a-110d with the second modular device may be controlled via a latch of modular device 100. The latch is described in more detail in FIG. 2. Modular device 100 may further include a module interface 112 to communicate with the second modular device. Module interface 112 may also be used to provide power to the second modular device or receive power from the second modular device.

FIG. 1B illustrates a perspective view of modular device 100 of FIG. 1A, according to an example. Housing 102 may include a set of openings to accommodate the set of attachment tabs 110a-110d. For example, housing 102 may include an opening 114a aligned with attachment tab 110a so that attachment tab 110a may extend into recessed region 108 via opening 114a. As another example, housing 102 may also include an opening 114b aligned with attachment tab 110b so that attachment tab 110b may extend into recessed region 108 via opening 114b. Openings of housing 102 that are aligned with attachment tabs 110c and 110d are not shown in FIG. 1B for purpose of clarity. Housing 102 may further include a sidewall 116 that is perpendicular to upper side 104. Sidewall 116 may include a first opening 118 to receive an anti-theft device, such as a Kensington lock.

FIG. 1C illustrates a bottom view of modular device 100 of FIG. 1A, according to an example. Housing 102 may include a lower side 120 that is opposite to upper side 104 and perpendicular to sidewall 116. Lower side 120 may a protruded region 122 that may be received in a recessed region of a third modular device. Protruded region 122 may include a set of third openings 124a-124d to receive attachment tabs of the third modular device. Protruded region 122 may also include a module interface 126 that is similar to module interface 112. Protruded region 122 may further include an opening 128 to accommodate a latch unlocking tab 130. Latch unlocking tab 130 may be exposed at opening 128 so that a user of modular device 100 may control a position of the latch (i.e., to engage or disengage the set of attachment tabs 110a-110d).

Figure 2:
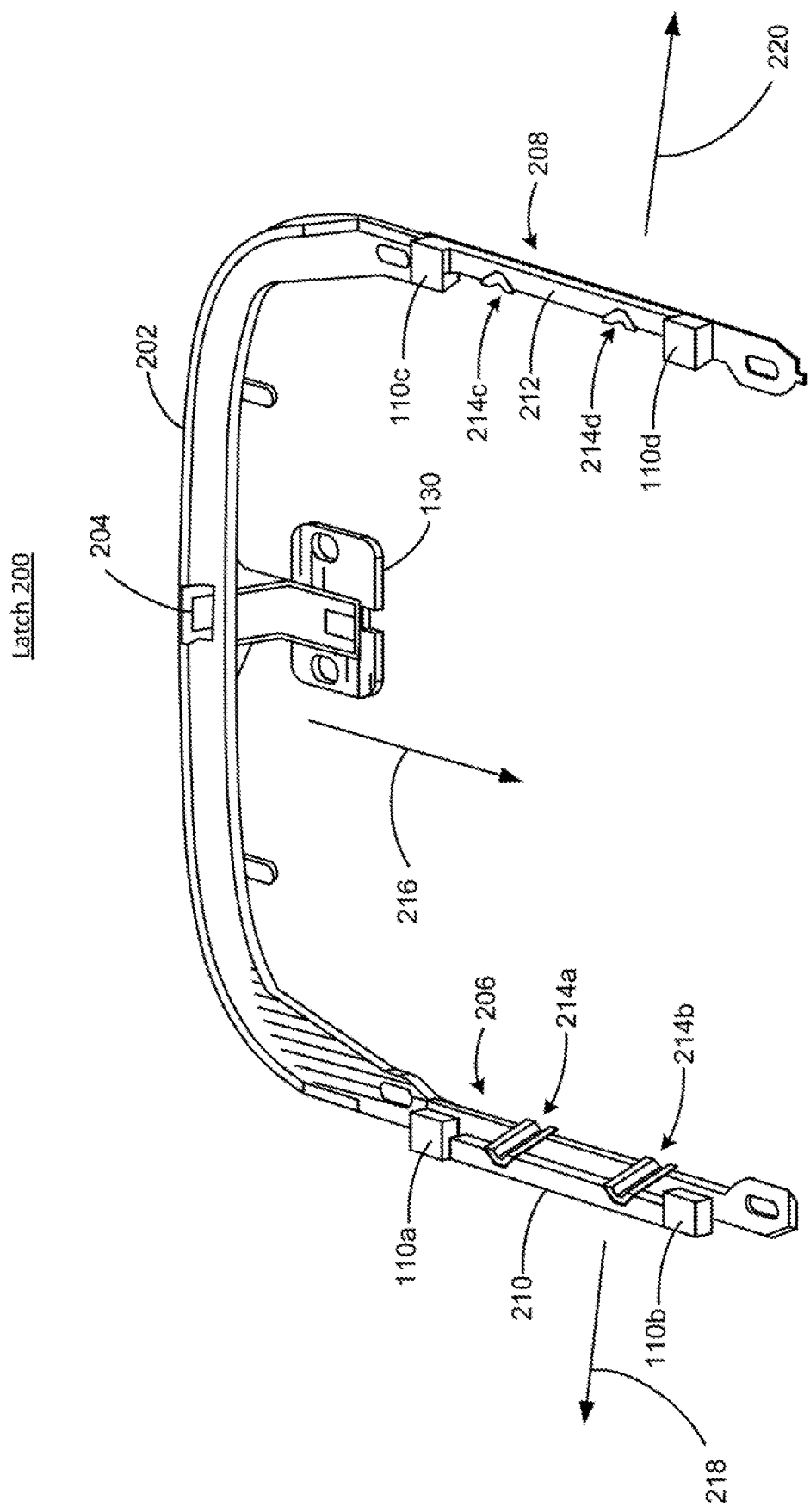
FIG. 2 illustrates a perspective view of a latch of the modular device of FIGS. 1A-1C to control an engagement of the set of attachment tabs, according to an example.

FIG. 2 illustrates a perspective view of a latch 200 of modular device 100 of FIGS. 1A-1C to control an engagement of the set of attachment tabs 110a-110d, according to an example. Latch 200 may include a main body 202 having a second opening 204. Second opening 204 may be aligned with first opening 118 of FIG. 1B to receive an anti-theft device. Latch 200 may also include a first latch arm 206 and a second latch arm 208. Latch arms 206 and 208 may extend from main body 202. Latch unlocking tab 130 may be formed as part of latch 200.

Attachment tabs 110a and 110b may be linked by a link member 210. In some examples, attachment tabs 110a and 110b and link member 210 may be formed as a single piece. Attachment tabs 110a and 110b and link member 210 may be in physical contact with latch arm 206. Attachment tabs 110c and 110d may be linked by a link member 212. In some examples, attachment tabs 110c and 110d and link member 212 may be formed as a single piece. Attachment tabs 110c and 110d and link member 212 may be in physical contact with latch arm 208.

During operation, when the set of attachment tabs 110a-110d is to be retracted into raised region 106 of modular device 100, latch 200 may be moved from a locked position to an unlocked position (as indicated by an arrow 216) via latch unlocking tab 130 controlled by a user. Wedges 214a-214b of latch arm 206 may push against link member 206 so that link member 210 and attachment tabs 110a-110b are moving away from latch arm 206 (as indicated by an arrow 218). Wedges 214c-214d of latch arm 208 may push against link member 212 so that link member 212 and attachment tabs 110c-110d are moving away from latch arm 208 (as indicated by an arrow 220). Thus, the set of attachment tabs 110a-110d may be retracted into raised region 106.

To extend the set of attachment tabs 110a-110d into recessed region 108, springs (not shown) may be used. For example, springs may be placed against tips of latch arms 206 and 208 and against link members 210 and 212. Thus, latch 200 may return to the unlocked position automatically and the set of attachment tabs 110a-110d may be extended when latch 200 is at the locked position. As described in more details in FIG. 3, when an anti-theft device is inserted into openings 118 and 204, the insertion of the anti-theft device may disable latch 200 from changing positions.

Figure 3:
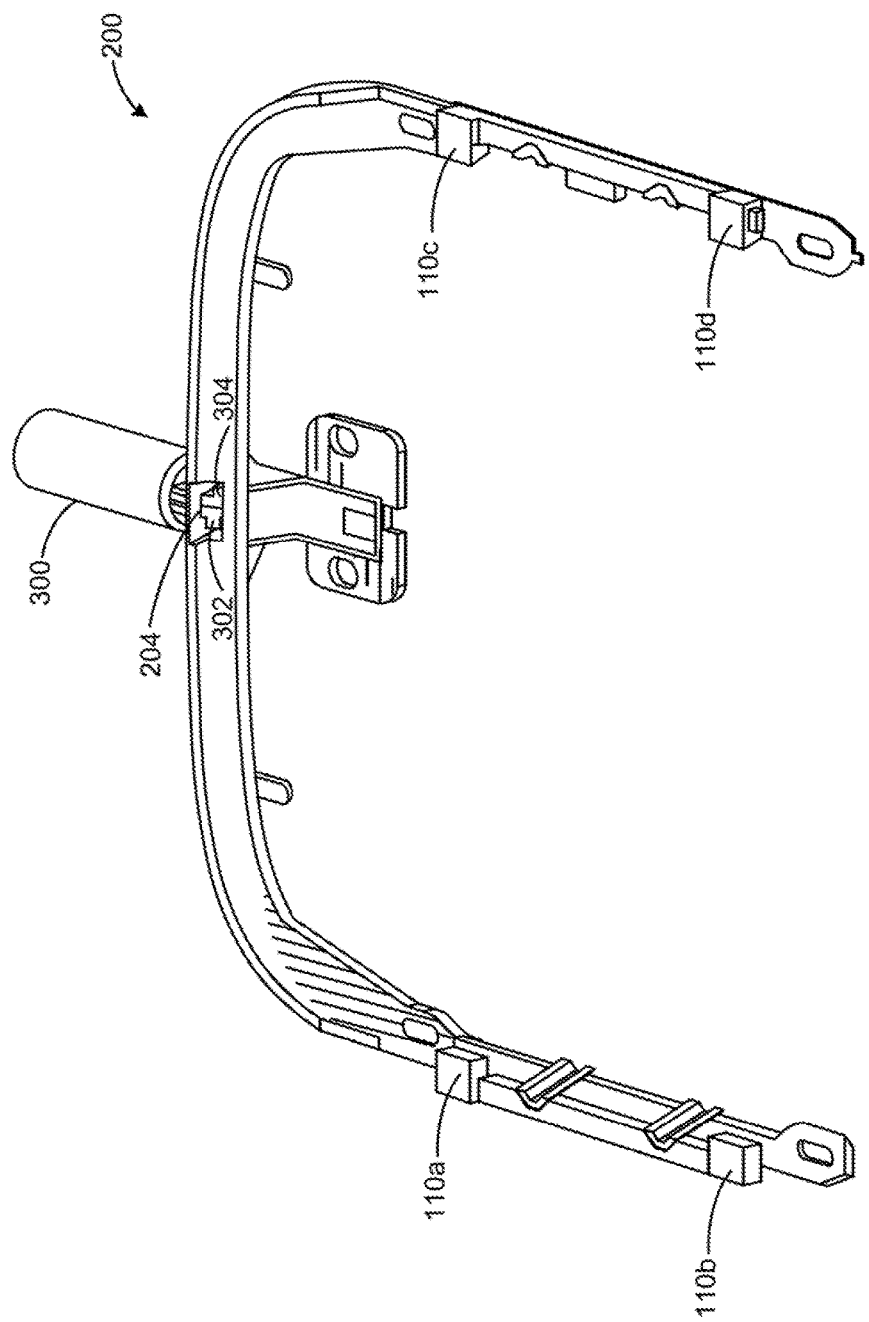
FIG. 3 illustrates a perspective view of the latch of FIG. 2 coupled to an anti-theft device to disable the latch from changing positions, according to an example.

FIG. 3 illustrates a perspective view of latch 200 of FIG. 2 coupled to an anti-theft device 300 to disable latch 200 from changing positions, according to an example. When modular device 100 of FIGS. 1A-1C is to be secured, anti-theft device 300 may be inserted into modular device 100 via first opening 118 (not shown in FIG. 3) and into latch 200 via second opening 204. Anti-theft device 300 may be implemented using a Kensington lock. It should be understood that other types of locks may also be used.

When anti-theft device 300 is inserted, a pair of prongs 302 and 304 of anti-theft device 300 may deploy behind second opening 204 to block latch 200 from moving relative to housing 102 of modular device 100 (not shown in FIG. 3). Thus, the deployed pair of prongs 302 and 304 may disable latch 200 from changing from the locked position to the unlocked position. The set of attachment tabs 110a-110d may remain in an extended position.

Figure 4:
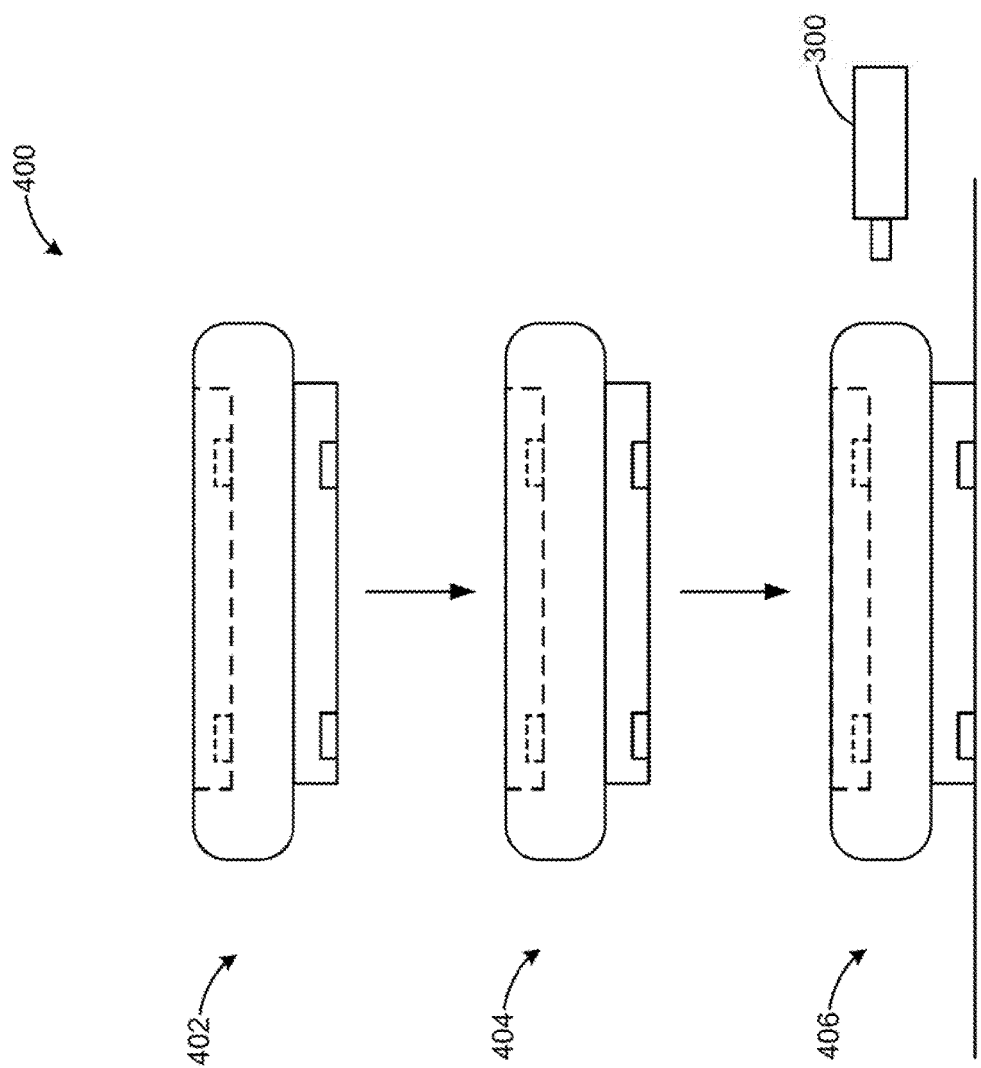
FIG. 4 illustrates a stacked modular computing system including a plurality of modular devices secured using a single anti-theft device, according to an example.

FIG. 4 illustrates a stacked modular computing system 400 including a plurality of modular devices 402-406 secured using a single anti-theft device 300, according to an example. Modular device 402-406 may be implemented using modular device 100 of FIGS. 1A-1C.

When modular computing system 400 is formed, first modular device 402 may be stacked on top of second modular device 404 and may be coupled to second modular device 404 via attachment tab(s) of second modular device 404. Second modular device 404 may be stacked on top of third modular device 406 and may be coupled to third modular device 406 via attachment tab(s) of third modular device 406. Modular computing system 400 may be placed on top of a desk. When anti-theft device 300 is inserted into third modular device 406 via an opening of third modular device 406, modular devices 402-406 may be secured against unauthorized removal from modular computing system 400. That is because third modular device 406 may not uncouple from second modular device 404 due to the insertion of anti-theft device 300. Second modular device 404 may not uncouple from first modular device 402 as a latch unlocking tab of second modular device 404 is covered by third modular device 406.

Figure 5:
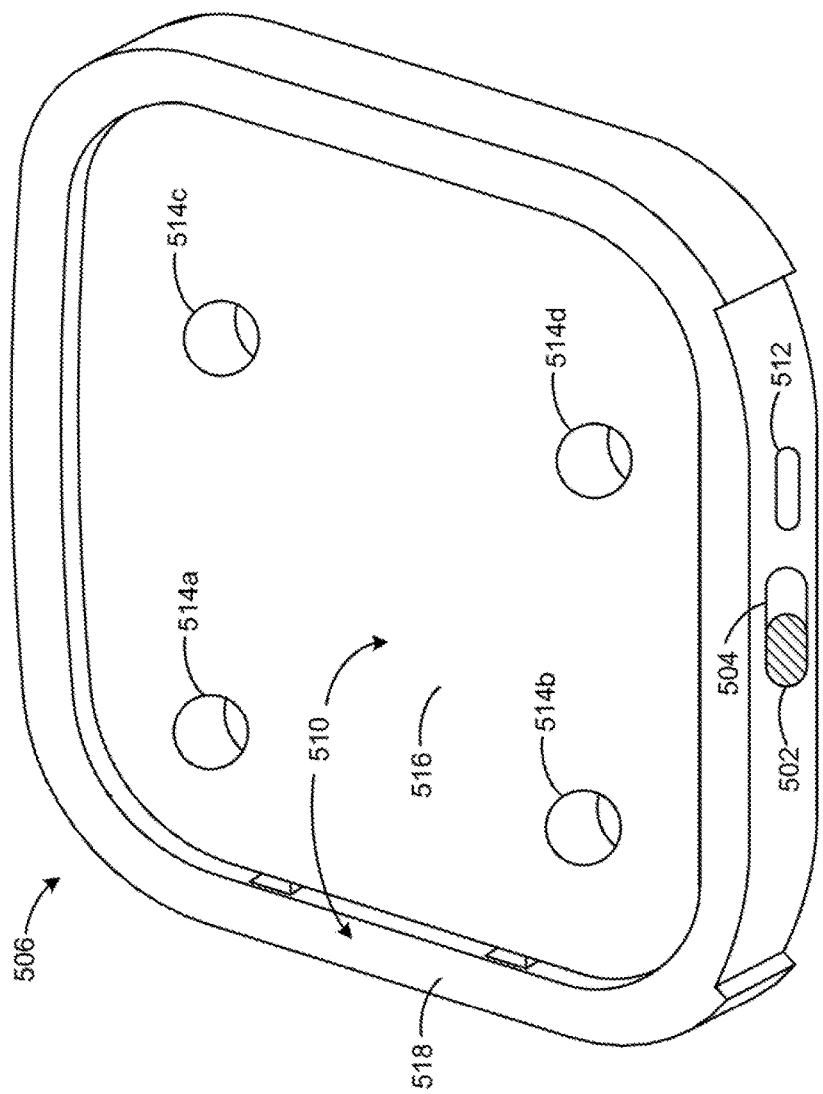
FIG. 5 illustrates a perspective view of a modular device having a latch unlocking tab exposed at a sidewall of the modular device, according to another example.

FIG. 5 illustrates a perspective view of a modular device 500 having a latch unlocking tab exposed at a sidewall of modular device 500, according to another example. Modular device 500 may be similar to modular device 100 of FIGS. 1A-1C. Unlike modular device 100, modular device 500 may include a latch unlocking tab 502 that is exposed at a first opening 504 of a housing 506 of modular device 500. First opening 504 may be located at a sidewall 508 of housing 506. Sidewall 508 may be perpendicular to an upper side 510 of housing 506 and a lower side (not shown in FIG. 5) of housing 506. Housing 506 may also include a second opening 512 at sidewall 508 to receive an anti-theft device, such as anti-theft device 300 of FIG. 3. Housing 506 may further include a set of mounting holes 514a-514d that extend from upper side 510 to the lower side. The set of mounting holes 514a-514d may be located in a recessed region 516 of housing 506. Housing 506 may further include a raised region 518 to house a set of attachment tabs (not shown in FIG. 5). The set of attachment tabs is described in more detail in FIG. 6.

Figure 6:
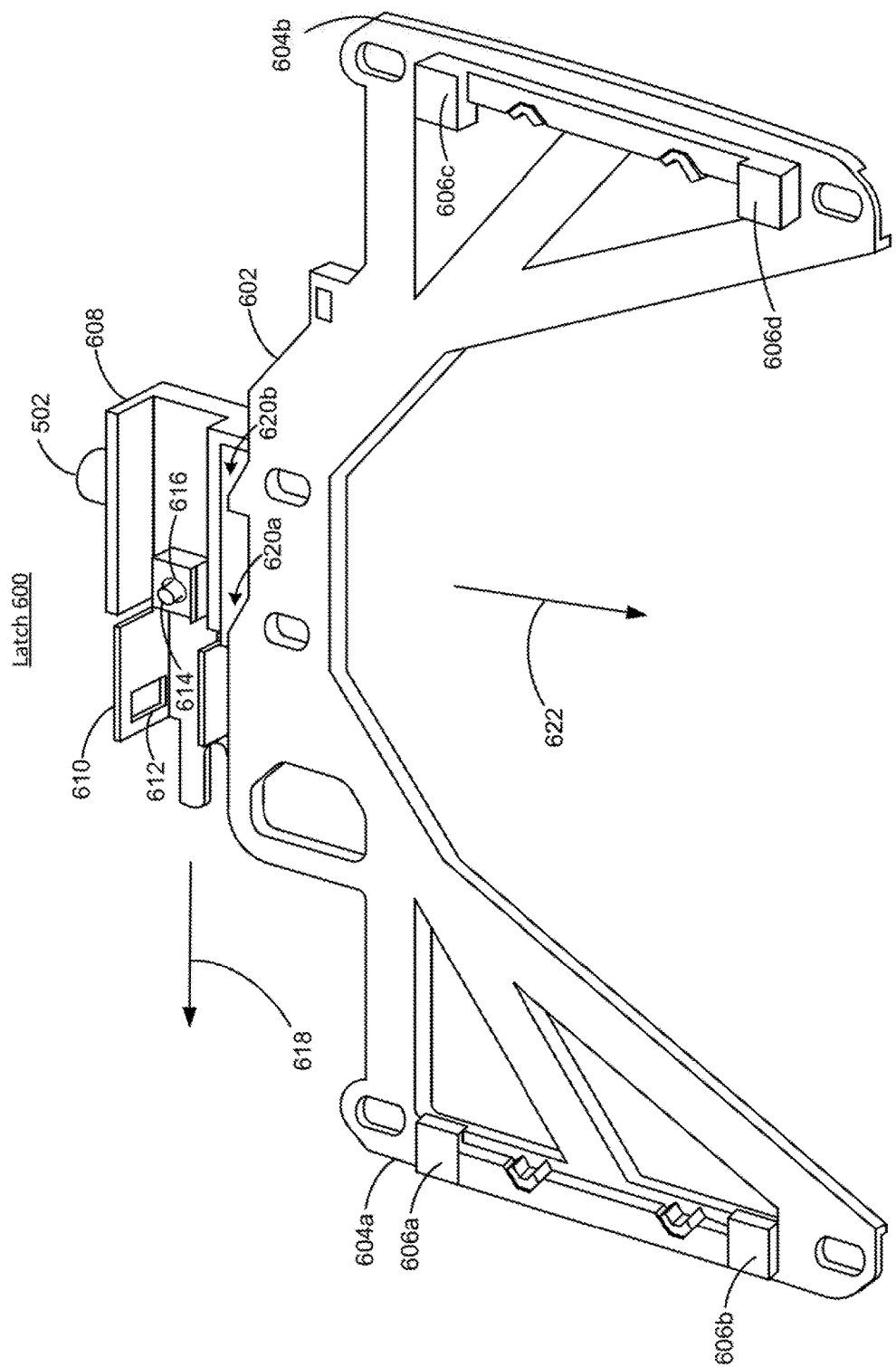
FIG. 6 illustrates a perspective view of a latch of the modular device of FIG. 5 to control an engagement of the set of attachment tabs, according to an example.

FIG. 6 illustrates a perspective view of a latch 600 of modular device 500 of FIG. 5 to control an engagement of a set of attachment tabs of modular device 500, according to an example. Latch 600 may be disposed within housing 506. Latch 600 may include a main body 602. Latch 600 may also include latch arms 604a-604b extending from main body 602. Latch arms 604a-604b may control an engagement of a set of attachment tabs 606a-606d with another modular device.

Latch 600 may further include a latch unlocking member 608 that is engaged with main body 602 to control a position of latch 600. Latch unlocking member 608 may include latch unlocking tab 502. Latch 600 may further include a latch securing member 610 engaged with latch unlocking member 608. Latch securing member 610 may include a third opening 612 that is aligned with second opening 512 to receive an anti-theft device. Latch securing member 610 may be secured to latch unlocking member 608 so that latch securing member 610 and latch unlocking member 608 move together. For example, latch securing member 610 may be secured to latch unlocking member 608 by receiving a protrusion 614 of latch unlocking member 608 in an opening 616 of latch securing member 610.

During operation, when the set of attachment tabs 606a-606d is to be retracted into raised region 518 of modular device 500, latch unlocking member 608 and latch securing member 610 may move laterally (as indicated by an arrow 618) so that latch 600 may be moved from a locked position to an unlocked position. When latch unlocking member 608 and latch securing member 610 move laterally, the movement may cause main body 602 to move away from latch unlocking member 608 and latch securing member 610 via step features 620a and 620b (as indicated by an arrow 622). The movement of main body 602 may cause attachment tabs 606a-606d to retract into raised region 518 in the same manner as described in FIG. 2. To return latch 600 from the unlocked position to a locked position, springs may be used in the same manner as described in FIG. 2.

Figure 7:
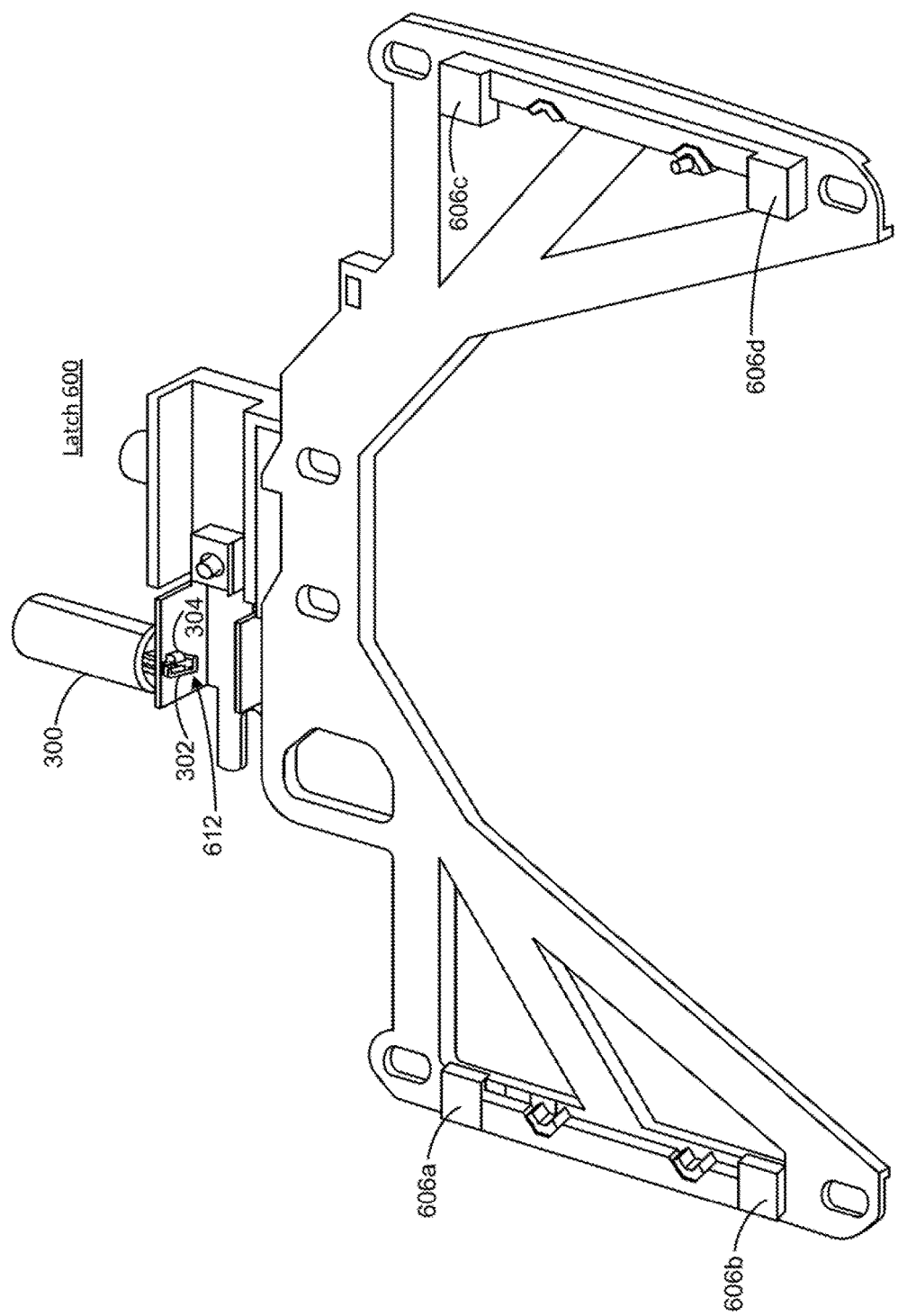
FIG. 7 illustrates a perspective view of the latch of FIG. 6 coupled to an anti-theft device to disable the latch from changing positions, according to an example.

FIG. 7 illustrates a perspective view of latch 600 of FIG. 6 coupled to anti-theft device 300 to disable latch 600 from changing positions, according to an example. When modular device 500 of FIG. 5 is to be secured, anti-theft device 300 may be inserted into modular device 500 via second opening 512 (not shown in FIG. 3) and into latch 600 via third opening 612. When anti-theft device 300 is inserted, the pair of prongs 302 and 304 of anti-theft device 300 may deploy behind third opening 612. The pair of prongs 302 and 304 may act as barrier to block latch unlocking member 608 and latch securing member 610 from moving laterally as described in FIG. 6. Thus, the deployed pair of prongs 302 and 304 may disable latch 600 from changing from the locked position to the unlocked position. The set of attachment tabs 606a-606d may remain in an extended position.

Figure 8:
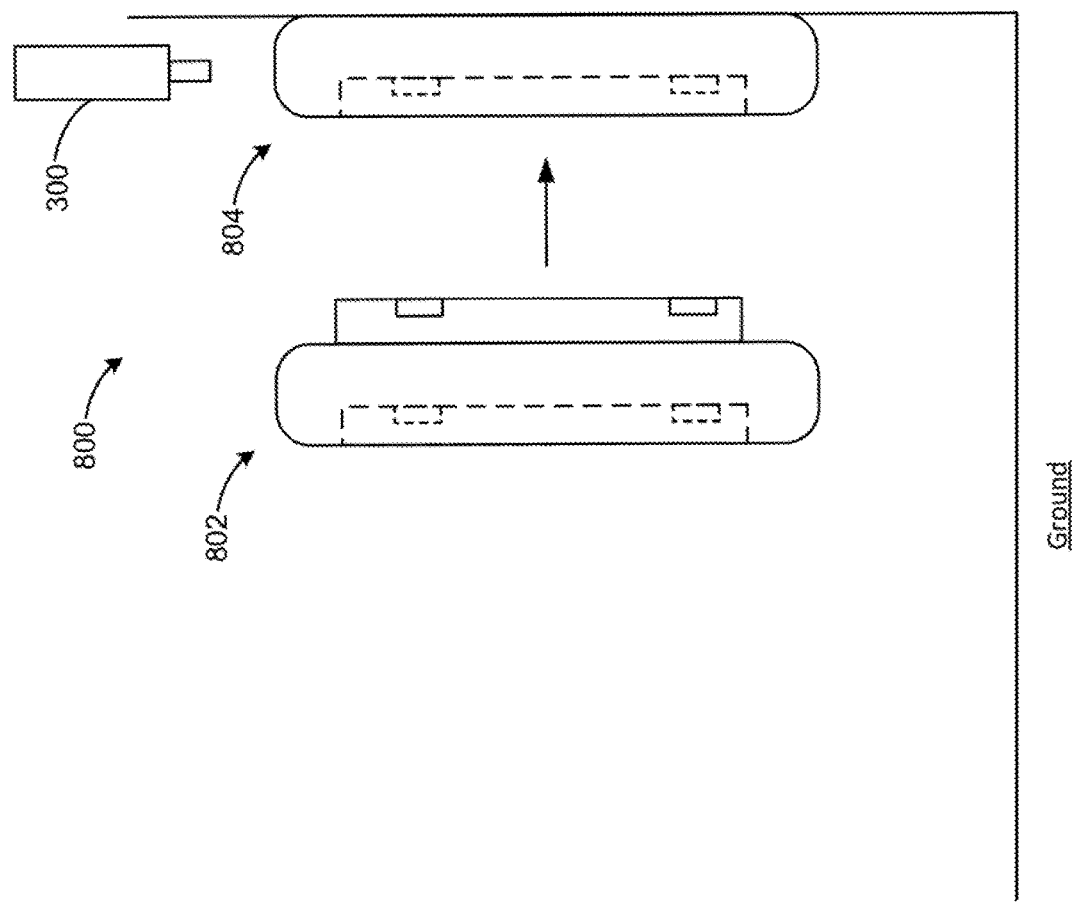
FIG. 8 illustrates a stacked modular computing system including a plurality of modular devices secured using a single anti-theft device, according to another example.

FIG. 8 illustrates a stacked modular computing system 800 including a plurality of modular devices secured using a single anti-theft device, according to another example. Modular computing system 800 may include a first modular device 802 and a second modular device 804. First modular device 802 may be implemented using modular device 100 of FIGS. 1A-1C. Second modular device 804 may be implemented using modular device 500 of FIG. 5.

When modular computing system 800 is formed, second modular device 804 may be mounted on a vertical surface (e.g., a wall) via mounting holes of second modular device 804 (e.g., mounting holes 514a-514d). First modular device 802 may be coupled to second modular device 804 via attachment tabs of second modular device 804. When anti-theft device 300 is inserted into second modular device 804, modular devices 802 and/or 804 may be secured against unauthorized removal from modular computing system 800.

The use of "comprising", "including" or "having" are synonymous and variations thereof herein are meant to be inclusive or open-ended and do not exclude additional unrecited elements or method steps.

What is claimed is:

1. A modular device comprising:
   a housing having an upper side, a lower side, and a sidewall having a first opening;
   an attachment tab to attach the modular device to a second modular device at the upper side;
   a link member to carry the attachment tab; and
   a latch disposed within the housing, wherein the latch includes:
   a main body having a second opening aligned with the first opening to receive a removeable anti-theft device;
   a latch arm extending from the main body to control an engagement of the attachment tab with the second modular device; and
   a latch unlocking tab exposed at the lower side to control a position of the latch;
   a wedge carried by the latch arm, wherein the wedge is positioned to push against the link member to move the link member and the attachment tab, when the latch is moved, to cause the attachment tab to disengage from the second modular device;
   wherein the second opening is positioned to cause insertion of the removeable anti-theft device into the second opening to disable the latch from being moved.

2. The modular device of claim 1, wherein the sidewall is perpendicular to the upper side and to the lower side.

3. The modular device of claim 1, wherein when the latch is in an unlocked position, the attachment tab is retracted into the housing, and wherein when the latch is in a locked position, the attachment tab is exposed outside of the housing via an opening of the upper side.

4. The modular device of claim 1, wherein the upper side includes a recessed region to receive a lower side of the second modular device when the modular device is attached to the second modular device.

5. The modular device of claim 1, wherein the lower side includes a third opening to receive an attachment tab of a third modular device.

6. A modular device comprising:
   a housing having an upper side, a lower side, and a sidewall having a first opening, wherein the upper side includes a recessed region, and wherein the lower side includes a protruded region;
   a link member disposed within the housing;
   an attachment tab disposed on the link member, the attachment tab extending towards the recessed region to attach the modular device to a second modular device; and
   a latch disposed within the housing, wherein the latch includes:
   a main body having a second opening aligned with the first opening to receive a removable anti-theft device; and
   a latch arm extending from the main body to control an engagement of the attachment tab with the second modular device, wherein the latch arm includes a wedge positioned to push against the link member to move the link member and the attachment tab, when the latch is moved to an unlocked position, to cause the attachment tab to disengage from the second modular device; and
   a latch unlocking tab exposed at the protruded region to control a position of the latch, wherein the protruded region is to be received in a recessed region of a third modular device when the modular device is attached to the second modular device;
   wherein the second opening is positioned to cause insertion of the removeable anti-theft device into the second opening to disable the latch from moving to the unlocked position.

7. The modular device of claim 6, wherein the sidewall is perpendicular to the upper side and to the lower side.

8. The modular device of claim 6, wherein when the latch is in the unlocked position, the attachment tab is retracted into the housing, and wherein when the latch is in a locked position, the attachment tab is exposed outside of the housing via an opening of the upper side.

9. The modular device of claim 6, wherein the lower side includes a third opening to receive an attachment tab of a third modular device.

10. A modular device comprising:
a housing having an upper side and a sidewall, wherein the sidewall includes a first opening and a second opening, and wherein the sidewall is perpendicular to the upper side;
a link member disposed within the housing;
an attachment tab disposed on the link member, the attachment tab to attach the modular device to a second modular device at the upper side; and
a latch disposed within the housing, wherein the latch includes:
a main body;
a latch arm extending from the main body to control an engagement of the attachment tab with the second modular device, wherein the latch arm includes a wedge positioned to push against the link member to move the link member and the attachment tab, when the latch is moved to an unlocked position, to cause the attachment tab to disengage from the second modular device;
a latch unlocking member engaged with the main body to control a position of the latch, wherein the latch unlocking member includes a latch unlocking tab exposed at the first opening; and
a latch securing member engaged with the latch unlocking member, wherein the latch securing member includes a third opening that is aligned with the second opening to receive a removable anti-theft device;
wherein the third opening is positioned to cause insertion of the removeable anti-theft device into the third opening to disable the latch from moving into the unlocked position.

11. The modular device of claim 10, further comprising:
a lower side; and
a plurality of mounting holes that extend from the upper side to the lower side.

12. The modular device of claim 11, wherein when the latch is in the unlocked position, the attachment tab is retracted into the housing, and wherein when the latch is in a locked position, the attachment tab is exposed outside of the housing via an opening of the upper side.

13. The modular device of claim 1, comprising a plurality of attachment tabs, including the attachment tab, disposed on the link member to attach the modular device to the second modular device at the upper side.

14. The modular device of claim 13, comprising a plurality of wedges, including the wedge, disposed on the latch arm, wherein the plurality of wedges is positioned to push against the link member to move the link member and the plurality of attachment tabs, when the latch is moved, to cause the plurality of attachment tabs to disengage from the second modular device.

* * * * *